US010791238B2

(12) United States Patent
Ogata et al.

(10) Patent No.: US 10,791,238 B2
(45) Date of Patent: Sep. 29, 2020

(54) IMAGE TERMINAL APPARATUS, TRANSMITTING METHOD AND COMPUTER READABLE RECORDING MEDIUM DETECTING A REMAINING AMOUNT OF DATA STORED IN A BUFFER MEMORY AND USING THE DETECTED REMAINING AMOUNT FOR CONTROL

(71) Applicant: Olympus Corporation, Hachioji-shi, Tokyo (JP)

(72) Inventors: Yoshihisa Ogata, Hachioji (JP); Takato Aoki, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/150,090

(22) Filed: Oct. 2, 2018

(65) Prior Publication Data

US 2019/0132472 A1 May 2, 2019

(30) Foreign Application Priority Data

Oct. 27, 2017 (JP) ................................. 2017-208526

(51) Int. Cl.
*H04N 1/21* (2006.01)
*H04N 1/00* (2006.01)
*H04N 5/232* (2006.01)

(52) U.S. Cl.
CPC ....... *H04N 1/2141* (2013.01); *H04N 1/00095* (2013.01); *H04N 1/215* (2013.01);
(Continued)

(58) Field of Classification Search
CPC ........... H04N 1/2141; H04N 5/232941; H04N 1/00095; H04N 1/215; H04N 1/2125; H04N 2201/0084
See application file for complete search history.

(56) References Cited

U.S. PATENT DOCUMENTS 6,930,712 B1 * 8/2005 Higuchi ............. H04N 1/00925
348/231.2
8,269,846 B2 * 9/2012 Takaiwa ............. H04N 1/00925
348/207.99
(Continued)

FOREIGN PATENT DOCUMENTS

JP 2007-013746 1/2007

*Primary Examiner* — Luong T Nguyen
(74) *Attorney, Agent, or Firm* — John C. Pokotylo; Pokotylo Patent Services (57) ABSTRACT

An image terminal apparatus includes: an imaging unit configured to image an object continuously and generate image data sequentially; a buffer memory configured to store temporarily and sequentially the image data; an I/F circuit configured to sequentially write the image data stored in the buffer memory on a recording medium attached externally; a communicating circuit configured to sequentially transmit the image data stored in the buffer memory through communication with a peripheral device according to a predetermined communication standard; a detecting circuit configured to detect a remaining amount of data storable in the buffer memory; a first determining circuit configured to determine whether the remaining amount is equal to or less than a predetermined threshold; and a data control circuit configured to control a mode of the image data sequentially stored in the buffer memory based on a determination result by the first determining circuit.

15 Claims, 5 Drawing Sheets

(52) U.S. Cl.
CPC ..... *H04N 1/2125* (2013.01); *H04N 5/232941*
(2018.08); *H04N 2201/0084* (2013.01)

(56) References Cited

U.S. PATENT DOCUMENTS

| | | | | |
|---|---|---|---|---|
| 2002/0051065 A1* | 5/2002 | Takahashi | .......... | H04N 1/32101 |
| | | | | 348/231.6 |
| 2002/0093575 A1* | 7/2002 | Kusaka | .................. | H04N 5/232 |
| | | | | 348/231.9 |
| 2016/0098192 A1* | 4/2016 | Ochi | ........................ | G06F 3/061 |
| | | | | 711/111 |

* cited by examiner

IMAGE TERMINAL APPARATUS, TRANSMITTING METHOD AND COMPUTER READABLE RECORDING MEDIUM DETECTING A REMAINING AMOUNT OF DATA STORED IN A BUFFER MEMORY AND USING THE DETECTED REMAINING AMOUNT FOR CONTROL

CROSS-REFERENCE TO RELATED APPLICATION

This application is based upon and claims the benefit of priority from Japanese Patent Application No. 2017-208526, filed on Oct. 27, 2017, the entire contents of which are incorporated herein by reference.

BACKGROUND

The present disclosure relates to an image terminal apparatus, a transmitting method, and a computer readable recording medium.

In an imaging apparatus such as a digital camera, a technique is known that wirelessly connects with peripheral devices and transmits image data to the peripheral devices (for example, JP 2007-13746 A). In this technique, an effective transfer rate of wireless communication is measured, and a result obtained by comparing this effective transfer rate with a threshold selected according to a communication purpose is displayed by a display, thereby allowing an operator to grasp a communication state.

SUMMARY

An image terminal apparatus according to one aspect of the present disclosure includes: an imaging unit configured to image an object continuously and generate image data sequentially; a buffer memory configured to store temporarily and sequentially the image data sequentially generated by the imaging unit; an I/F circuit configured to sequentially write the image data temporarily and sequentially stored in the buffer memory on a recording medium attached externally; a communicating circuit configured to sequentially transmit the image data stored in the buffer memory through communication with a peripheral device according to a predetermined communication standard; a detecting circuit configured to detect a remaining amount of data storable in the buffer memory; a first determining circuit configured to determine whether the remaining amount detected by the detecting circuit is equal to or less than a predetermined threshold; and a data control circuit configured to control a mode of the image data sequentially stored in the buffer memory based on a determination result by the first determining circuit.

The above and other features, advantages and technical and industrial significance of this invention will be better understood by reading the following detailed description of presently preferred embodiments of the invention, when considered in connection with the accompanying drawings.

DETAILED DESCRIPTION

Hereinafter, embodiments for carrying out the present disclosure will be described in detail with reference to the drawings. The present disclosure is not limited by the following embodiments. In addition, the drawings referred to in the following description merely schematically illustrate shapes, sizes, and positional relationships to an extent that contents of the present disclosure can be understood. In other words, the present disclosure is not limited to the shapes, sizes, and positional relationships exemplified in each drawing.

First Embodiment

Configuration of Image Terminal Apparatus

Figure 1:
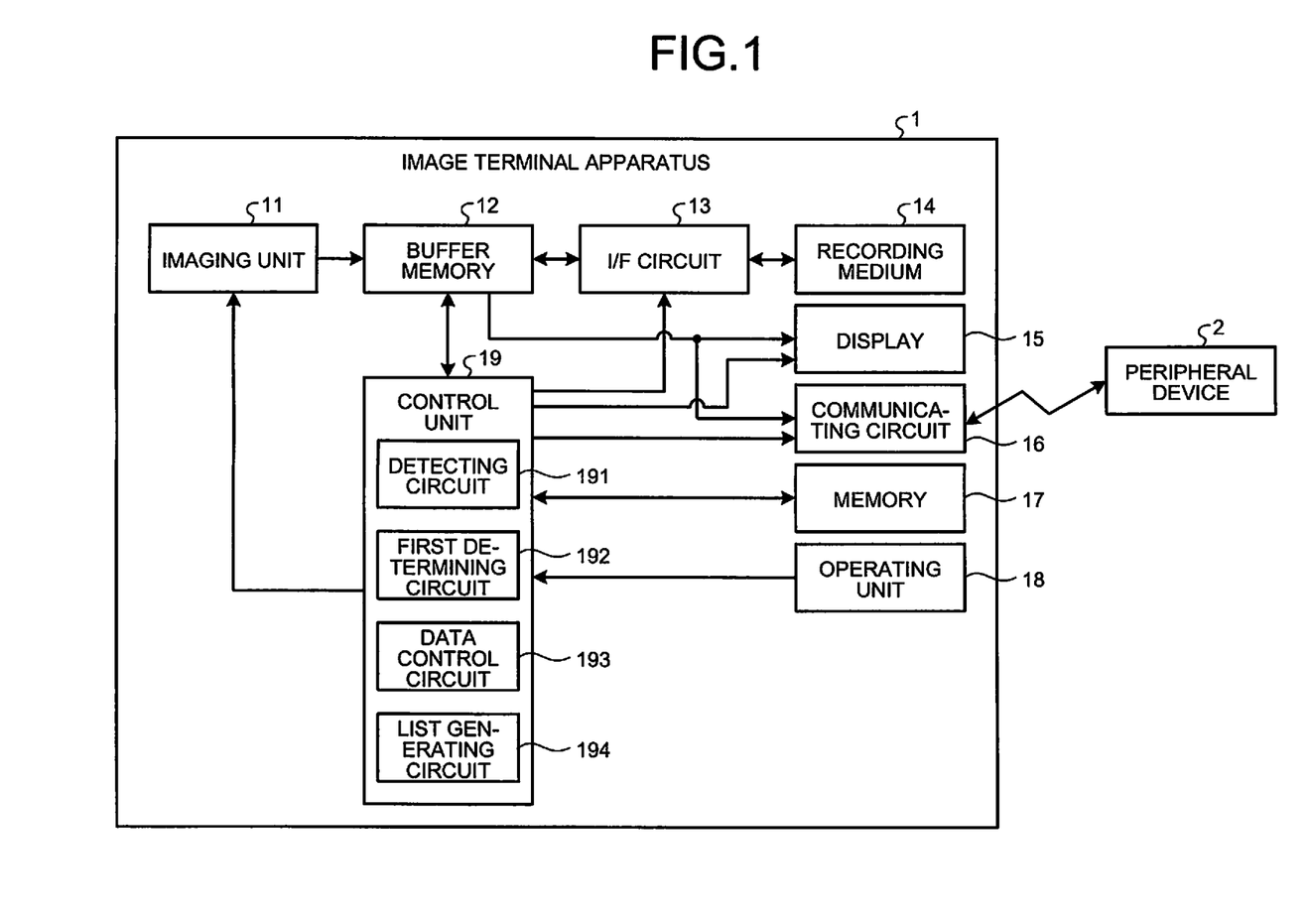
FIG. 1 is a block diagram illustrating a functional configuration of an image terminal apparatus according to a first embodiment.

FIG. 1 is a block diagram illustrating a functional configuration of an image terminal apparatus according to a first embodiment. An image terminal apparatus 1 illustrated in FIG. 1 images an object, generates image data, and transmits the image data to a peripheral device 2 through wireless communication. For example, the image terminal apparatus 1 includes any of, for example, a digital camera capable of continuously capturing image data, a digital video camera, a camcorder, a mobile phone or a tablet terminal with an imaging function, a monitoring camera, an IC recorder with an imaging function, and an rigid endoscope, and includes any of an endoscope capable of wirelessly transmitting various data and a microscope such as a video microscope. In addition, the peripheral device 2 is, for example, a printer that prints images corresponding to image data, a photo storage that accumulates image data, a personal computer that allows viewing and editing of images corresponding to image data, an image server that records image data, a mobile phone, and a tablet terminal.

The image terminal apparatus 1 includes an imaging unit 11, a buffer memory 12, an I/F circuit 13, a recording medium 14, a display 15, a communicating circuit 16, a memory 17, an operating unit 18, and a control unit 19.

Under control of the control unit 19, the imaging unit 11 images an object and generates image data to be output to the buffer memory 12. Further, when continuous capturing under the control of the control unit 19, the imaging unit 11 continuously images an object and generates temporally continuous image data to be sequentially output to the buffer memory 12. The imaging unit 11 has at least one or more lenses and includes an optical system that forms an object image, an image sensor such as a charge coupled device (CCD) that receives the object image formed by the optical system and carries out photoelectric conversion to generate an imaging signal and a complementary metal oxide semiconductor (CMOS), and an image engine such as a graphics processing unit (GPU) that generates image data by subjecting the imaging signal generated by the image sensor to predetermined image processing and a field programmable gate array (FPGA). Here, the predetermined image processing includes A/D converting processing, demosaicing processing, white balance adjusting processing, gain-up processing, and image file generating processing for generating thumbnail image data that form a part of meta information (meta data) of an image file such as Exif and a file name.

Under the control of the control unit 19, the buffer memory 12 temporarily stores (temporarily records) the image data sequentially input from the imaging unit 11 to be output to the I/F circuit 13, the communicating circuit 16, and the control unit 19. Further, the buffer memory 12 temporarily stores image data read by the I/F circuit 13 from the recording medium 14. The buffer memory 12 includes a volatile memory of a synchronous dynamic random access memory (SDRAM) or a nonvolatile memory of a solid state drive (SSD).

Under the control of the control unit 19, the I/F circuit 13 sequentially writes and records the image data temporarily stored in the buffer memory 12 on the recording medium 14. Under the control of the control unit 19, the I/F circuit 13 sequentially reads the image data recorded on the recording medium 14 to be output to the buffer memory 12. The I/F circuit 13 includes, for example, a memory card reader/writer. In the first embodiment, the I/F circuit 13 functions as a writing unit.

The recording medium 14 is detachably attached to the image terminal apparatus 1 via the I/F circuit 13. The recording medium 14 records the image data written via the I/F circuit 13. In the recording medium 14, the image data recorded via the I/F circuit 13 is read. The recording medium 14 includes a memory card or the like.

Under the control of the control unit 19, the display 15 displays images corresponding to image data input from the buffer memory 12, live view images, and various kinds of information on the image terminal apparatus 1. The display 15 includes a display panel such as organic electro luminescence (EL) or a liquid crystal.

Under the control of the control unit 19, the communicating circuit 16 transmits the image data input from the buffer memory 12 to the peripheral device 2 according to a predetermined wireless communication standard. Here, a predetermined wireless communication standard is, for example, IEEE802.11a, IEEE802.11b, IEEE802.11n, IEEE802.11g, IEEE802.11ac, long term evolution (LTE), WiMAX, Bluetooth (registered trademark), and infrared communication standards. In the first embodiment, IEEE802.11ac. is used for transmission. The communicating circuit 16 includes a communication module.

The memory 17 temporarily records various programs executed by the image terminal apparatus 1 and data being processed. The memory 17 includes an SDRAM, a flash memory, or the like.

The operating unit 18 receives an input of a user's operation and outputs an instruction signal according to the received input to the control unit 19. The operating unit 18 includes a touch panel, buttons, switches, cross keys, and the like.

The control unit 19 totally controls each unit of the image terminal apparatus 1. The control unit 19 includes a central processing unit (CPU), an application specific integrated circuit (ASIC), or the like. The control unit 19 has a detecting circuit 191, a first determining circuit 192, a data control circuit 193, and a list generating circuit 194.

The detecting circuit 191 detects a remaining amount of data that the buffer memory 12 can store. Specifically, the detecting circuit 191 detects, as a remaining amount, a value obtained by subtracting a sum of amounts of a plurality of pieces of image data stored in the buffer memory 12 from a total capacity of the buffer memory 12.

The first determining circuit 192 determines whether the remaining amount of data in the buffer memory 12 detected by the detecting circuit 191 is equal to or less than a predetermined threshold.

The data control circuit 193 controls a mode of the image data sequentially stored in the buffer memory 12 based on a determination result by the first determining circuit 192. More specifically, when the first determining circuit 192 determines that the remaining amount of data in the buffer memory 12 is equal to or less than the predetermined threshold, the data control circuit 193 stops the transmission of the image data from the communicating circuit 16 and sequentially deletes the image data from the buffer memory 12, after the I/F circuit 13 sequentially writes the image data from the buffer memory 12 on the recording medium 14.

The list generating circuit 194 generates a list of the image data deleted by the data control circuit 193 from the buffer memory 12.

Processing of Image Terminal Apparatus

Figure 2:
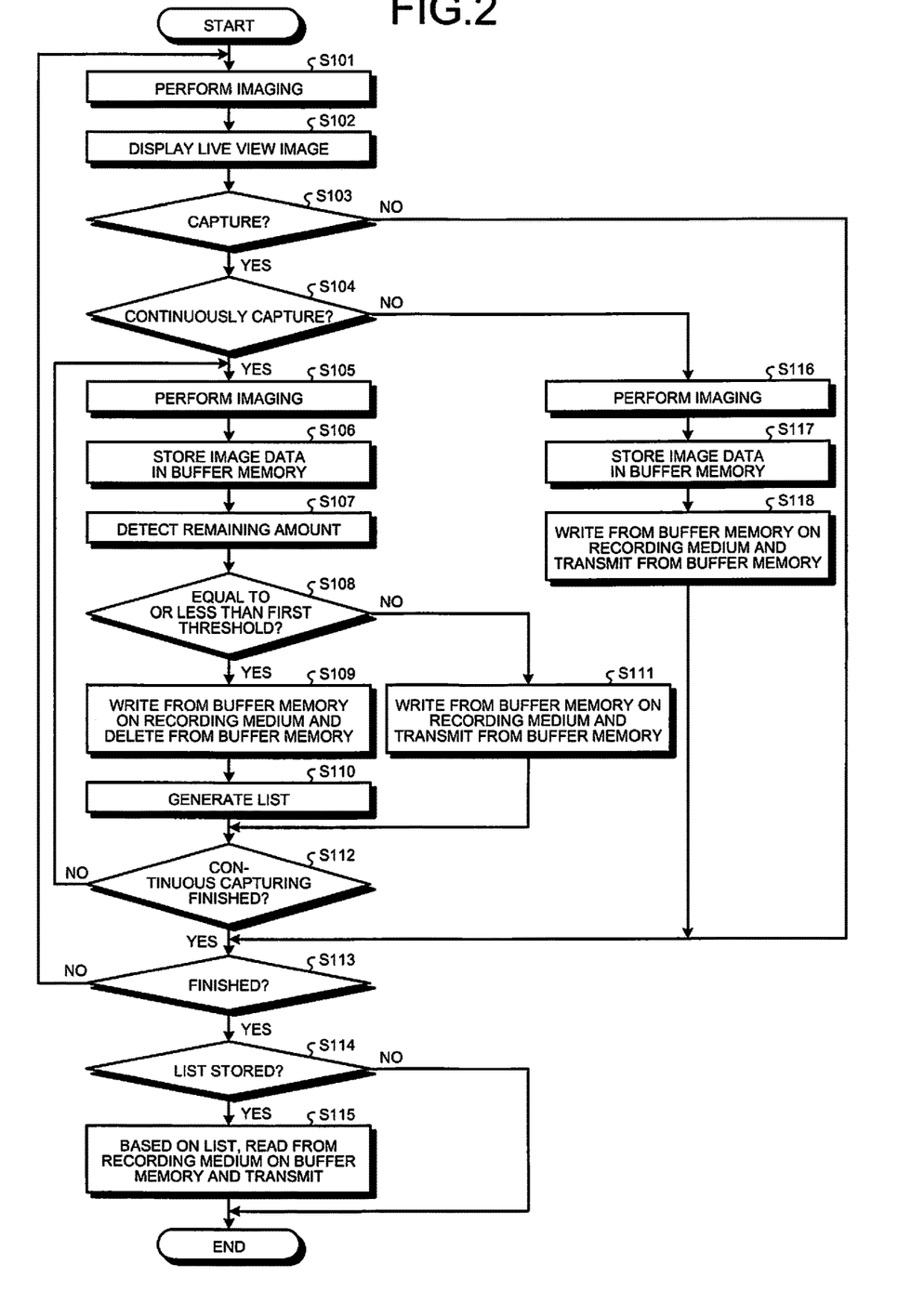
FIG. 2 is a flowchart illustrating an outline of processing executed by the image terminal apparatus according to the first embodiment.

Next, processing executed by the image terminal apparatus 1 will be described. FIG. 2 is a flowchart illustrating an outline of the processing executed by the image terminal apparatus 1.

As illustrated in FIG. 2, first, the control unit 19 causes the imaging unit 11 to perform imaging (step S101) and causes the display 15 to display a live view image corresponding to image data generated by the imaging unit (step S102).

When a signal for instructing capturing is input from the operating unit 18 (step S103: Yes), the control unit 19 causes, during continuous capturing (step S104: Yes), the imaging unit 11 to perform imaging (step S105) and to store image data in the buffer memory 12 (step S106).

Subsequently, the detecting circuit 191 detects the remaining amount of data that the buffer memory 12 can store (step S107). For example, the detecting circuit 191 detects, as a remaining amount, the number of frames of remaining image data that the buffer memory 12 can store and a remaining memory capacity.

Thereafter, the first determining circuit 192 determines whether the remaining amount detected by the detecting circuit 191 is equal to or less than a first threshold (step S108). When the first determining circuit 192 determines that the remaining amount detected by the detecting circuit 191 is equal to or less than the first threshold (step S108: Yes), the image terminal apparatus 1 shifts to step S109 described later. On the other hand, when the first determining circuit 192 determines that the remaining amount detected by the detecting circuit 191 is not equal to or less than the first threshold (step S108: No), the image terminal apparatus 1 shifts to step S111 described later.

In step S109, the data control circuit 193 causes the I/F circuit 13 to write the image data from the buffer memory 12 on the recording medium 14, keeps the communicating circuit 16 from transmitting the image data, and deletes the image data from the buffer memory 12. As a result, even when the image data are sequentially stored in the buffer memory 12 by continuous capturing, the image data are sequentially deleted from the buffer memory 12, and a remaining capacity of the buffer memory 12 can be prevented from being exhausted. Therefore, it is possible to prevent stopping in the course of continuous capturing.

Subsequently, the list generating circuit 194 generates a list of the image data that the data control circuit 193 keeps the communicating circuit 16 from transmitting the image data, and deletes from the buffer memory 12 (step S110). Specifically, when the data control circuit 193 deletes the image data from the buffer memory 12, the list generating circuit 194 generates a list relating to a file name (text data) of the image data to be recorded on the buffer memory 12 or the recording medium 14. After step S110, the image terminal apparatus 1 shifts to step S112 described later.

In step S111, the data control circuit 193 causes the I/F circuit 13 to write the image data from the buffer memory 12 on the recording medium 14 and causes the communicating circuit 16 to transmit the image data stored by the buffer memory 12. After step S111, the image terminal apparatus 1 shifts to step S112 described later.

In step S112, the control unit 19 determines whether continuous capturing is finished. For example, the control unit 19 determines whether the operating unit 18 is held down. Specifically, the control unit 19 determines whether the signal for instructing capturing is continuously input from the operating unit 18 by a user's holding down the operating unit 18. When the input of the instruction signal is stopped, it is determined that continuous capturing is finished (step S112: Yes), and the image terminal apparatus 1 shifts to step S113 described later. On the other hand, when it is determined that the signal for instructing capturing is continuously input from the operating unit 18 by a user's holding down the operating unit 18, it is determined that continuous capturing is not finished (Step S112: No), and the image terminal apparatus 1 shifts to step S105 described above.

In step S113, when a signal for instructing finishing is input from the operating unit 18 (step S113: Yes), the image terminal apparatus 1 shifts to step S114 described later. On the other hand, when the signal for instructing finishing is not input from the operating unit 18 (step S113: No), the image terminal apparatus 1 returns to step S101 described above.

In step S114, when the list generated by the list generating circuit 194 is stored in the buffer memory 12 (step S114: Yes), the data control circuit 193 causes, based on the list stored in the buffer memory 12, the I/F circuit 13 to read a group of the untransmitted image data from the recording medium 14 on the buffer memory 12 and causes the communicating circuit 16 to sequentially transmit the image data (step S115). As a result, it is possible to transmit the group of the untransmitted image data to the peripheral device 2 during an idling period after the image terminal apparatus 1 finishes capturing. After step S115, the image terminal apparatus 1 finishes the present processing.

In step S114, when the list generated by the list generating circuit 194 is not stored in the buffer memory 12 (step S114: No), the image terminal apparatus 1 finishes the present processing.

In step S103, when the signal for instructing capturing is input from the operating unit 18 (step S103: Yes), the control unit 19 causes, except during continuous capturing (step S104: No), the imaging unit 11 to perform imaging (Step S116) and to store the image data in the buffer memory 12 (step S117).

Subsequently, the data control circuit 193 causes the I/F circuit 13 to write the image data from the buffer memory 12 on the recording medium 14 and causes the communicating circuit 16 to transmit the image data stored by the buffer memory 12 (step S118). After step S118, the image terminal apparatus 1 shifts to step S113.

In step S103, when the signal for instructing capturing is not input from the operating unit 18 (step S103: No), the image terminal apparatus 1 shifts to step S113.

According to the first embodiment described above, when the first determining circuit 192 determines that the remaining capacity of the buffer memory 12 detected by the detecting circuit 191 is equal to or less than the first threshold, the data control circuit 193 causes the I/F circuit 13 to write the image data from the buffer memory 12 on the recording medium 14, keeps the communicating circuit 16 from transmitting the image data, and deletes the image data from the buffer memory 12. As a result, a capacity of the buffer memory 12 is not filled up even when untransmitted image data remain in the buffer memory 12, which makes it possible to continue capturing.

According to the first embodiment, since the list generating circuit 194 generates the list of the image data deleted from the buffer memory 12 by the data control circuit 193, presence or absence of the image data captured during continuous capturing can be confirmed after capturing is finished.

According to the first embodiment, when capturing by the image terminal apparatus 1 is finished, the data control circuit 193 causes the I/F circuit 13 to read the image data corresponding to the list generated by the list generating circuit 194 from the recording medium 14 on the buffer memory 12 to be transmitted by the communicating circuit 16. Therefore, even when image data are unable to be wirelessly transferred to the peripheral device 2 in real time while capturing, capturing can be continued.

In the first embodiment, based on the list stored in the buffer memory 12, the data control circuit 193 causes the I/F circuit 13 to read the group of the untransmitted image data from the recording medium 14 on the buffer memory 12 and causes the communicating circuit 16 to sequentially transmit the image data, but may cause the communicating circuit 16 to transmit the list to the peripheral device 2. As a result, a user can confirm that capturing has been performed in a series of continuous capturing.

In the first embodiment, although the detecting circuit 191 detects the remaining capacity of the buffer memory 12, a remaining amount of the recording medium 14 may be detected. In this case, when the remaining amount of the recording medium 14 detected by the detecting circuit 191 becomes full, the data control circuit 193 may cause the communicating circuit 16 to transmit the image data without causing the recording medium 14 to record and delete the image data from the buffer memory 12. As a result, capturing can be continued.

In the first embodiment, when the first determining circuit 192 determines that the remaining capacity of the buffer memory 12 detected by the detecting circuit 191 is equal to or less than the first threshold, the data control circuit 193 causes the I/F circuit 13 to write the image data from the buffer memory 12 on the recording medium 14, keeps the communicating circuit 16 from transmitting the image data, and deletes the image data from the buffer memory 12. However, the data control circuit 193 may further cause the display 15 to display a message that the image data are unable to be transmitted due to insufficient remaining capacity of the buffer memory 12. Of course, sound may be output by, for example, a speaker (not illustrated) for warning.

In the first embodiment, when the first determining circuit 192 determines that the remaining capacity of the buffer memory 12 detected by the detecting circuit 191 is equal to or less than the first threshold, the data control circuit 193 may cause the I/F circuit 13 to write the image data from the buffer memory 12 on the recording medium 14 and change a communication method of the communicating circuit 16. For example, the data control circuit 193 may switch the communication method of the communicating circuit 16 from IEEE802.11ac to LTE, or transmission may be carried out by two communication standards, IEEE 802.11ac and LTE.

Second Embodiment

Next, a second embodiment will be described. An image terminal apparatus according to the second embodiment has a configuration identical to one of the image terminal apparatus 1 according to the first embodiment, and processing to be executed is different. Therefore, processing executed by the image terminal apparatus according to the second embodiment will be described below. Configurations identical to those of the image terminal apparatus 1 according to the first embodiment are denoted by identical reference numerals, and descriptions thereof are omitted.

Processing of Image Terminal Apparatus

Figure 3:
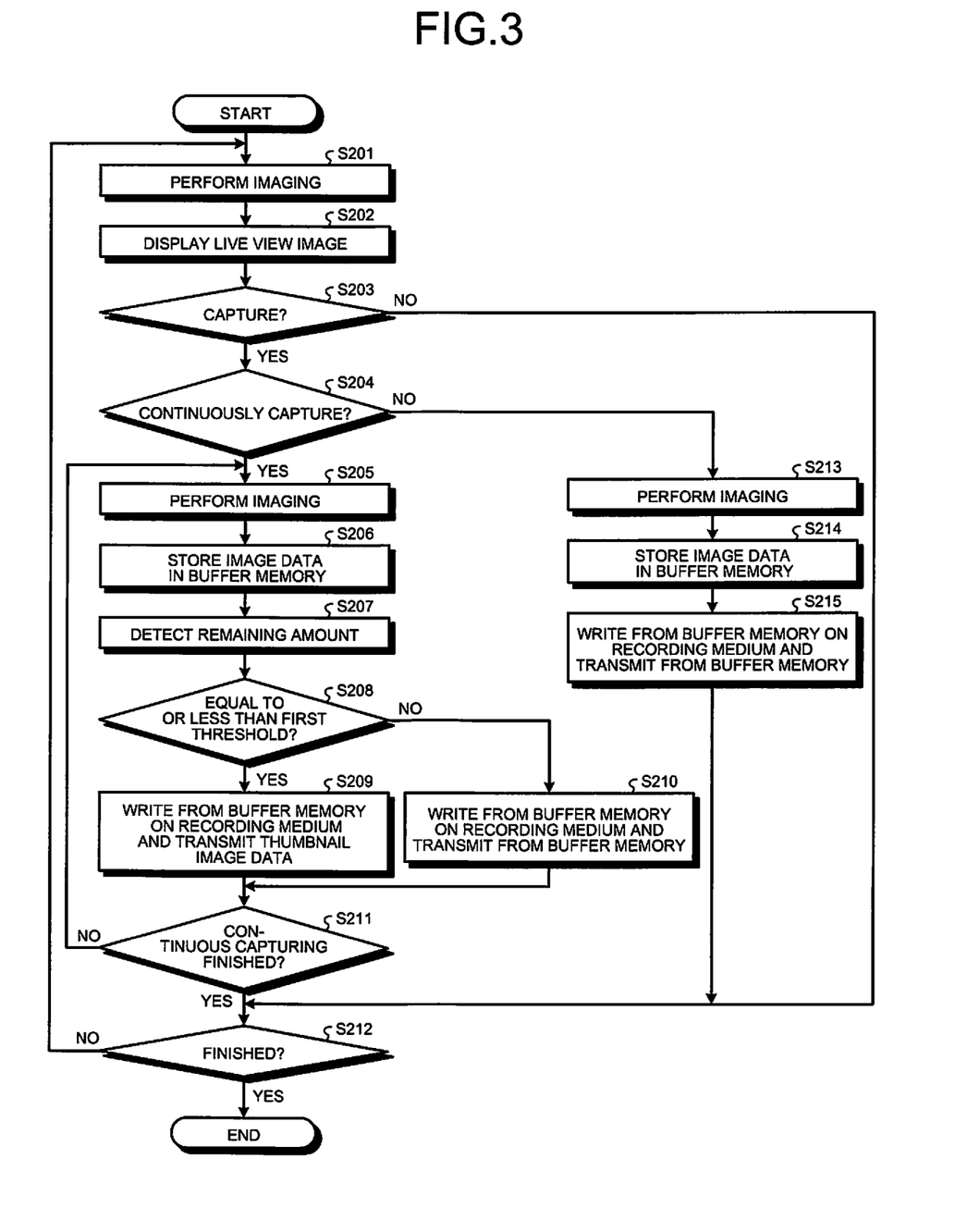
FIG. 3 is a flowchart illustrating an outline of processing executed by an image terminal apparatus according to a second embodiment.

FIG. 3 is a flowchart illustrating an outline of the processing executed by the image terminal apparatus 1 according to the second embodiment. In FIG. 3, steps S201 to S208 correspond to steps S101 to S108 in FIG. 2 described above, respectively. Further, steps S210 to S215 correspond to steps S111 to S113 and steps S116 to S118 in FIG. 2 described above, respectively.

In step S209, the data control circuit 193 causes the I/F circuit 13 to write the image data from the buffer memory 12 on the recording medium 14 and causes the communicating circuit 16 to transmit, as a part of the image data, thumbnail image data that store Exif of an image file. In this case, the data control circuit 193 deletes the image data, of which thumbnail image data are transmitted, from the buffer memory 12. As a result, even when the image data are sequentially stored in the buffer memory 12 by continuous capturing, the image data are deleted from the buffer memory 12, and the remaining capacity of the buffer memory 12 is increased. Therefore, it is possible to prevent stopping in the course of continuous capturing. After step S209, the image terminal apparatus 1 shifts to step S211.

According to the second embodiment described above, the data control circuit 193 causes the I/F circuit 13 to write the image data from the buffer memory 12 on the recording medium 14 and causes the communicating circuit 16 to transmit the thumbnail image data as a part of the image data. Therefore, even when the image data are wirelessly transferred to the peripheral device 2 in real time while capturing, capturing can be continued.

In the second embodiment, the data control circuit 193 causes the communicating circuit 16 to transmit, but not limited to, the thumbnail image data as a part of the image data and may cause the communicating circuit 16 to transmit, instead of the thumbnail image data, a file name of the image data or resized data obtained by compressing the image data. When causing the communicating circuit 16 to transmit the resized data, the data control circuit 193 compresses an amount of the image data and generates the compressed image data (resized image data) to be transmitted by the communicating circuit 16.

In the second embodiment, the data control circuit 193 causes the communicating circuit 16 to transmit, but not limited to, the thumbnail image data as a part of the image data and may cause the communicating circuit 16 to transmit, for example, image data at a start of continuous capturing and image data at a finish of continuous capturing and delete, from the buffer memory 12, image data groups from the image data at the start of continuous capturing to the image data at the finish of continuous capturing, generated by the imaging unit 11 during continuous capturing. Needless to say, the data control circuit 193 may decimate, at predetermined intervals, a plurality of pieces of image data sequentially generated by the imaging unit 11 during continuous capturing to be transmitted by the communicating circuit 16 and delete the decimated image data from the buffer memory 12.

Third Embodiment

Next, a third embodiment will be described. An image terminal apparatus according to a third embodiment is different from the image terminal apparatus 1 according to the first embodiment in configuration and processing to be executed. A configuration of the image terminal apparatus according to the third embodiment will be described below, followed by description of the processing executed by the image terminal apparatus according to the third embodiment. Configurations identical to those of the image terminal apparatus 1 according to the first embodiment are denoted by identical reference numerals, and descriptions thereof are omitted.

Configuration of Image Terminal Apparatus

Figure 4:
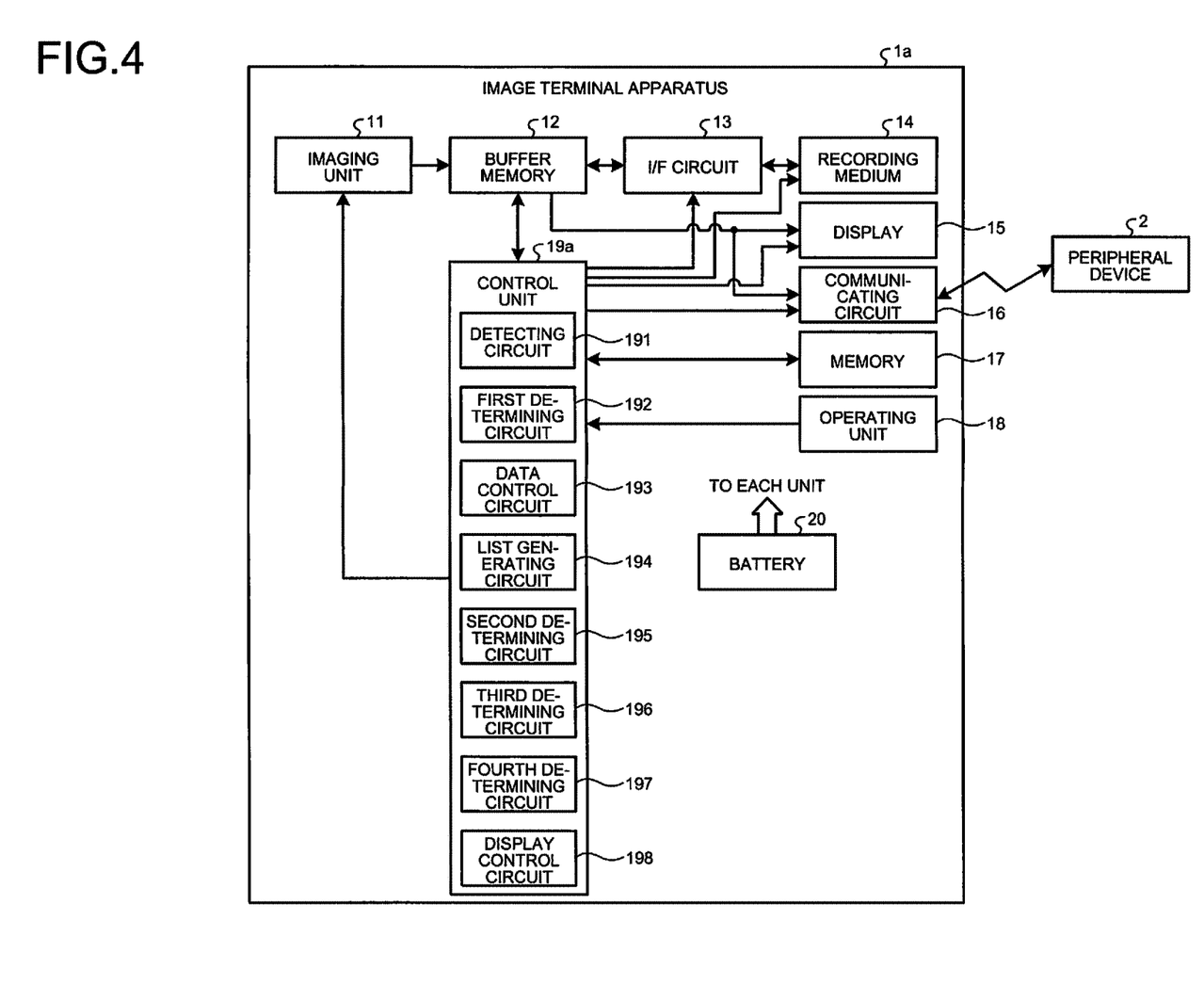
FIG. 4 is a block diagram illustrating a functional configuration of an image terminal apparatus according to a third embodiment.

FIG. 4 is a block diagram illustrating a functional configuration of an image terminal apparatus according to a third embodiment. An image terminal apparatus 1a illustrated in FIG. 4 includes a control unit 19a in place of the control unit 19 according to the first embodiment. Further, the image terminal apparatus 1a has a battery 20 that supplies power to each unit of the image terminal apparatus 1a.

The control unit 19a totally controls each unit that constitutes the image terminal apparatus 1a. The control unit 19a includes a CPU or an ASIC. In addition to the configuration of the control unit 19 according to the first embodiment, the control unit 19a further includes a second determining circuit 195, a third determining circuit 196, a fourth determining circuit 197, and a display control circuit 198.

The second determining circuit 195 determines whether a communication state by the communicating circuit 16 is equal to or less than a predetermined threshold. Specifically, the second determining circuit 195 determines whether a current communication speed by the communicating circuit 16 is equal to or less than a predetermined threshold.

The third determining circuit 196 determines whether a remaining level of the battery 20 is equal to or less than a predetermined threshold. For example, the third determining circuit 196 determines whether the remaining level of the battery 20 is 10% or less.

The fourth determining circuit 197 determines whether the remaining amount of data that the recording medium 14 can record is equal to or less than a predetermined threshold. For example, the fourth determining circuit 197 determines whether the remaining amount of data that the recording medium 14 can record is an amount of data capable of recording image data of about one sheet.

When the second determining circuit 195 determines that the communication state by the communicating circuit 16 is equal to or less than a predetermined threshold, the display control circuit 198 causes the display 15 to display a warning indicating that the communication state by the communicating circuit 16 is deteriorated.

Processing of Image Terminal Apparatus

Figure 5:
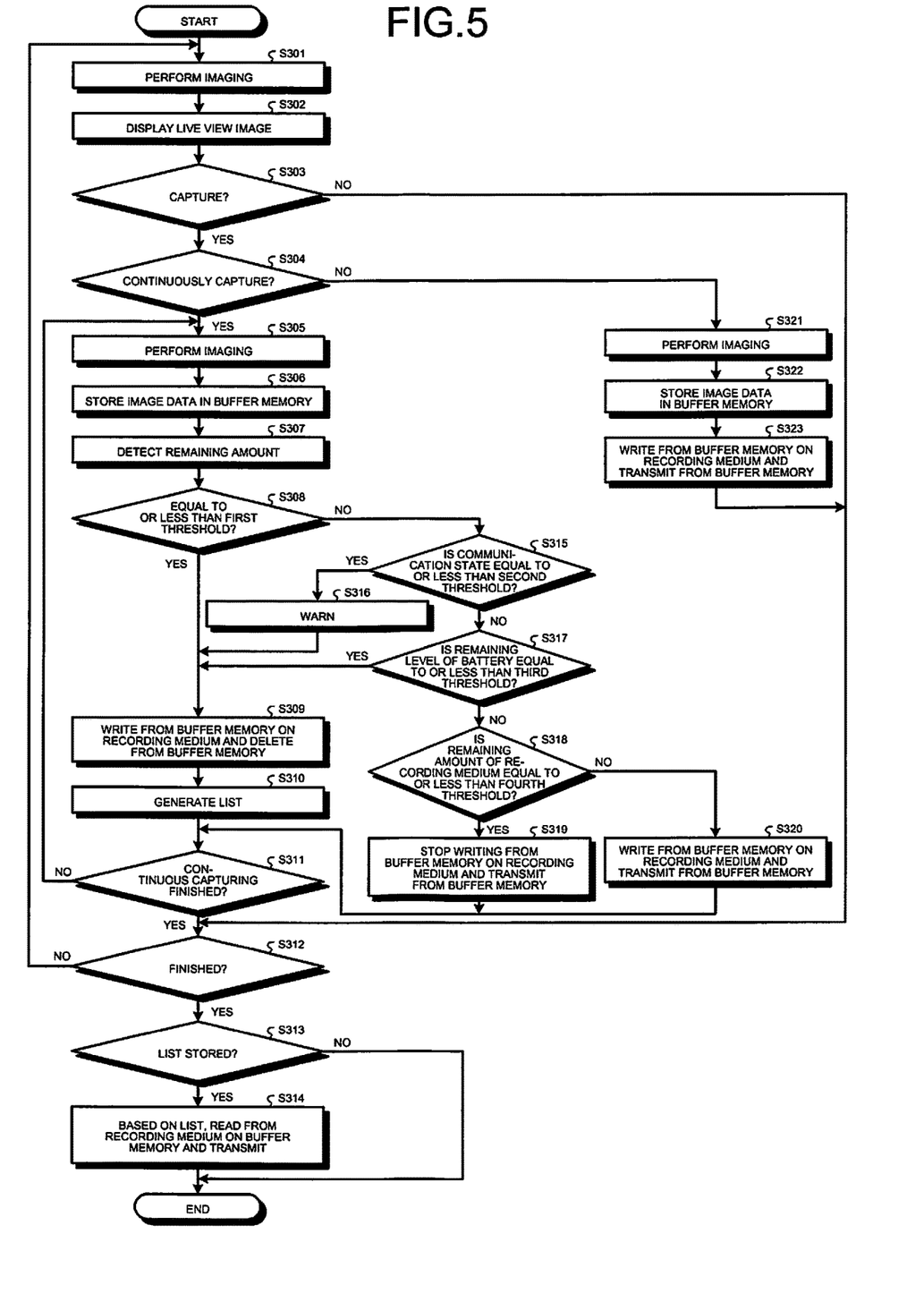
FIG. 5 is a flowchart illustrating an outline of processing executed by the image terminal apparatus according to the third embodiment.

Next, the processing executed by the image terminal apparatus 1a will be described. FIG. 5 is a flowchart illustrating an outline of the processing executed by the image terminal apparatus 1a. In FIG. 5, steps S301 to S314 correspond to steps S101 to S110 and steps S112 to S115 in FIG. 2 described above, respectively.

In step S315, the second determining circuit 195 determines whether the communication state by the communicating circuit 16 is equal to or less than a second threshold. Specifically, the second determining circuit 195 determines whether a communication speed at which the communicating circuit 16 transmits to the peripheral device 2 is equal to or less than the second threshold. When the second determining circuit 195 determines that the communication state by the communicating circuit 16 is equal to or less than the second threshold (step S315: Yes), the image terminal apparatus 1a shifts to step S316. On the other hand, when the second determining circuit 195 determines that the communication state by the communicating circuit 16 is not equal to or less than the second threshold (step S315: No), the image terminal apparatus 1a shifts to step S317.

In step S316, the display control circuit 198 causes the display 15 to display the warning indicating that the communication state by the communicating circuit 16 is deteriorated. Thus, a user can intuitively grasp that the communication state by the communicating circuit 16 is deteriorated. After step S316, the image terminal apparatus 1a shifts to step S309.

In step S317, the third determining circuit 196 determines whether the remaining level of the battery 20 is equal to or less than a third threshold. When the third determining circuit 196 determines that the remaining level of the battery 20 is equal to or less than the third threshold (step S317: Yes), the image terminal apparatus 1a shifts to step S309. On the other hand, when the third determining circuit 196 determines that the remaining level of the battery 20 is not equal to or less than the third threshold (step S317: No), the image terminal apparatus 1a shifts to step S318 described later.

In step S318, the fourth determining circuit 197 determines whether the remaining amount of data that the recording medium 14 can record is equal to or less than a predetermined threshold. When the fourth determining circuit 197 determines that the remaining amount of data that the recording medium 14 can record is less than or equal to a fourth threshold (step S318: Yes), the image terminal apparatus 1a shifts to step S319 described later. On the other hand, when the fourth determining circuit 197 determines that the remaining amount of data that the recording medium 14 can record is not less than or equal to the fourth threshold (step S318: No), the image terminal apparatus 1a shifts to step S320.

In step S319, the data control circuit 193 causes the I/F circuit 13 to stop writing image data from the buffer memory 12 on the recording medium 14, causes the communicating circuit 16 to sequentially transmit the image data stored in the buffer memory 12, and deletes the image data transmitted from the buffer memory 12 by the communicating circuit 16. As a result, it is possible to prevent discontinuing capturing as the amount of data of the recording medium 14 becomes full. After step S319, the image terminal apparatus 1a shifts to step S311.

Step S320 corresponds to step S111 in FIG. 2 described above. Steps S321 to S323 correspond to steps S116 to S118 in FIG. 2 described above, respectively.

According to the third embodiment, when the second determining circuit 195 determines that the communication state by the communicating circuit 16 is equal to or less than the second threshold, the data control circuit 193 causes the I/F circuit 13 to write the image data from the buffer memory 12 on the recording medium 14, keeps the communicating circuit 16 from transmitting the image data, and deletes the image data from the buffer memory 12. Therefore, even when the image data are sequentially stored in the buffer memory 12 by continuous capturing, or even when the communication state is not favorable, it is possible to prevent stopping in the course of continuous capturing.

In addition, according to the third embodiment, when the third determining circuit 196 determines that the remaining level of the battery 20 is equal to or less than the third threshold, the data control circuit 193 causes the I/F circuit 13 to write the image data from the buffer memory 12 on the recording medium 14, keeps the communicating circuit 16 from transmitting the image data, and deletes the image data from the buffer memory 12. Therefore, even when the image data are sequentially stored in the buffer memory 12 by continuous capturing, it is possible to prevent the image data from not being recorded on the recording medium 14 by giving priority to writing on the recording medium 14.

Other Embodiments

Various embodiments can be formed by appropriately combining a plurality of components disclosed in the first to the third embodiments. For example, some components may be removed from all of the components described in the first to the third embodiments. In addition, the components described in the first to the third embodiments may be appropriately combined.

Further, in the first to the third embodiments of the present disclosure, the "unit" described above can be replaced with "means", "circuit", or the like. For example, a control unit can be replaced with a control means or a control circuit.

In addition, the programs executed by the image terminal apparatuses according to the first to the third embodiments of the present disclosure are provided by being recorded in file data in an installable form or in an executable form on computer readable recording media such as a CD-ROM, a flexible disk (FD), a CD-R, a digital versatile disk (DVD), a USB medium, and a flash memory.

The programs executed by the image terminal apparatuses according to the first to the third embodiments of the present disclosure may be provided by being stored on a computer connected to a network such as the Internet and downloaded via the network. Furthermore, the programs executed by the image terminal apparatuses according to the first to the third embodiments of the present disclosure may be provided or distributed via a network such as the Internet.

In descriptions of the flowcharts in the present specification, as for processing, a relationship between steps is clearly indicated by using expressions such as "first", "thereafter", and "subsequently". However, processing sequences necessary for carrying out the present disclosure are not uniquely determined by those expressions. In other words, the processing sequences in the flowcharts described in the present specification can be changed within a range without inconsistency.

Although some of the embodiments of the present application have been described in detail based on the drawings, they are merely examples. The present disclosure can be carried out with the embodiments described in the present disclosure and other embodiments with various types of changes or improvements made based on knowledge of those skilled in the art.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. An image terminal apparatus comprising:
an imaging unit configured to image an object continuously and generate image data sequentially;
a buffer memory configured to store temporarily and sequentially the image data sequentially generated by the imaging unit;
an interface (I/F) circuit configured to sequentially write the image data temporarily and sequentially stored in the buffer memory on a recording medium attached externally;
a communicating circuit configured to sequentially transmit the image data stored in the buffer memory through communication with a peripheral device according to a predetermined communication standard;
a detecting circuit configured to detect a remaining amount of data storable in the buffer memory;
a first determining circuit configured to determine whether the remaining amount of data detected by the detecting circuit is equal to or less than a first predetermined threshold; and
a data control circuit configured to control a mode of the image data sequentially stored in the buffer memory based on a determination result determined by the first determining circuit,
wherein the imaging unit generates thumbnail image data that form a part of meta information of an image file that stores the image data when generating the image data,
wherein responsive to a determination, by the first determining circuit, that the remaining amount of data is equal to or less than the first predetermined threshold, the data control circuit (1) controls the communicating circuit to sequentially transmit the thumbnail image data as a part of the image data, and (2) deletes the image data from the buffer memory, and
wherein responsive to the determination, by the first determining circuit, that the remaining amount of data is not equal to or less than the first predetermined threshold, the data control circuit controls the communicating circuit to sequentially transmit the image data.

2. The image terminal apparatus according to claim 1, wherein the data control circuit controls the communicating circuit to stop transmitting the image data and deletes the image data from the buffer memory when the first determining circuit determines that the remaining amount is equal to or less than the first predetermined threshold.

3. The image terminal apparatus according to claim 2, further comprising a list generating circuit configured to generate a list of the image data deleted from the buffer memory, wherein
when the imaging unit stops generating the image data, the data control circuit controls the I/F circuit to write, on the buffer memory, untransmitted image data corresponding to the list from among a plurality of pieces of the image data recorded on the recording medium and controls the communicating circuit to transmit the untransmitted image data.

4. The image terminal apparatus according to claim 1, wherein
the imaging unit generates a file name that forms a part of meta information of the image file that stores the image data when generating the image data, and the data control circuit controls the communicating circuit to sequentially transmit the file name as a part of the image data.

5. The image terminal apparatus according to claim 1, wherein the data control circuit controls the communicating circuit to sequentially transmit, as a part of the image data, compressed image data obtained by compressing the image data.

6. An image terminal apparatus comprising:
an imaging unit configured to image an object continuously and generate image data sequentially;
a buffer memory configured to store temporarily and sequentially the image data sequentially generated by the imaging unit;
an interface (I/F) circuit configured to sequentially write the image data temporarily and sequentially stored in the buffer memory on a recording medium attached externally;
a communicating circuit configured to sequentially transmit the image data stored in the buffer memory through communication with a peripheral device according to a predetermined communication standard;
a detecting circuit configured to detect a remaining amount of data storable in the buffer memory;
a first determining circuit configured to determine whether the remaining amount of data detected by the detecting circuit is equal to or less than a predetermined threshold; and
a data control circuit configured to control a mode of the image data sequentially stored in the buffer memory based on a determination result determined by the first determining circuit,
wherein when the first determining circuit determines that the remaining amount of data is equal to or less than the predetermined threshold, the data control circuit decimates, at predetermined intervals, a plurality of pieces of the image data generated by the imaging unit thereby defining decimated pieces of the image data and non-decimated pieces of the image data, and sequentially transmits the non-decimated pieces of the image data by the communicating circuit and deletes the decimated pieces of the image data from the buffer memory.

7. An image terminal apparatus comprising:
an imaging unit configured to image an object continuously and generate image data sequentially;
a buffer memory configured to store temporarily and sequentially the image data sequentially generated by the imaging unit;
an interface (I/F) circuit configured to sequentially write the image data temporarily and sequentially stored in the buffer memory on a recording medium attached externally;
a communicating circuit configured to sequentially transmit the image data stored in the buffer memory through communication with a peripheral device according to a predetermined communication standard;
a detecting circuit configured to detect a remaining amount of data storable in the buffer memory;
a first determining circuit configured to determine whether the remaining amount of data detected by the detecting circuit is equal to or less than a predetermined threshold; and
a data control circuit configured to control a mode of the image data sequentially stored in the buffer memory based on a determination result determined by the first determining circuit, wherein when the first determining circuit determines that the remaining amount of data is equal to or less than the predetermined threshold, the data control circuit controls the communicating circuit to transmit first image data at a start of continuous capturing and second image data at a finish of continuous capturing and deletes, from the buffer memory, at least some of the first image data at the start of continuous capturing and the second image data at the finish of continuous capturing.

8. The image terminal apparatus according to claim 1, further comprising a second determining circuit configured to determine whether a communication state by the communicating circuit is equal to or less than a second predetermined threshold, wherein
the data control circuit controls the communicating circuit to stop transmitting the image data and deletes the image data from the buffer memory when the second determining circuit determines that the communication state is equal to or less than the second predetermined threshold.

9. The image terminal apparatus according to claim 8, further comprising:
a display configured to display an image corresponding to the image data; and
a display control circuit configured to control the display to display a warning indicating that the communication state is deteriorated when the second determining circuit determines that the communication state is equal to or less than the second predetermined threshold.

10. The image terminal apparatus according to claim 1, further comprising:
a third determining circuit configured to determine whether a remaining level of a battery provided in the image terminal apparatus is equal to or less than a third predetermined threshold, wherein
the data control circuit controls the communicating circuit to stop transmitting the image data and deletes the image data from the buffer memory when the third determining circuit determines that the remaining level of the battery is equal to or less than the third predetermined threshold.

11. The image terminal apparatus according to claim 1, further comprising:
a fourth determining circuit configured to determine whether a remaining amount of data recordable in the recording medium is equal to or less than a fourth predetermined threshold, wherein
the data control circuit controls the I/F circuit to stop writing the image data from the buffer memory on the recording medium, controls the communicating circuit to stop transmitting the image data stored in the buffer memory, and deletes the image data transmitted by the communicating circuit from the buffer memory when the fourth determining circuit determines that the remaining amount of data recordable in the recording medium is equal to or less than the fourth predetermined threshold.

12. A transmitting method executed by an image terminal apparatus comprising:
imaging an object continuously and generating image data sequentially by an imaging unit;
storing, in a buffer memory, temporarily and sequentially the image data sequentially generated by the imaging unit;
sequentially writing the image data temporarily and sequentially stored in the buffer memory on a recording medium attached externally;
generating thumbnail image data that form a part of meta information of an image file that stores the image data when generating the image data;
detecting a remaining amount of data storable in the buffer memory;
determining whether the remaining amount of data is equal to or less than a predetermined threshold; and
responsive to a determination that the remaining amount of data is equal to or less than the predetermined threshold,
(1) controlling a communicating circuit to sequentially transmit the thumbnail image data as a part of the image data to a peripheral device, and
(2) deleting the image data from the buffer memory, and
otherwise responsive to the determination that the remaining amount of data is not equal to or less than the predetermined threshold, controlling the communicating circuit to sequentially transmit the image data to the peripheral device.

13. A non-transitory computer readable recording medium on which an executable program is recorded, the program instructing a processor of an image terminal apparatus to execute:
imaging an object continuously and generating image data sequentially by an imaging unit;
storing, in a buffer memory, temporarily and sequentially the image data sequentially generated by the imaging unit;
sequentially writing the image data temporarily and sequentially stored in the buffer memory on a recording medium attached externally;
generating thumbnail image data that form a part of meta information of an image file that stores the image data when generating the image data;
detecting a remaining amount of data storable in the buffer memory;
determining whether the remaining amount of data is equal to or less than a predetermined threshold; and
responsive to a determination that the remaining amount of data is equal to or less than the predetermined threshold,
(1) controlling a communicating circuit to sequentially transmit the thumbnail image data as a part of the image data to a peripheral device, and
(2) deleting the image data from the buffer memory, and
otherwise responsive to the determination that the remaining amount of data is not equal to or less than the predetermined threshold, controlling the communicating circuit to sequentially transmit the image data to the peripheral device.

14. A method for controlling an image terminal apparatus, the method comprising:
continuously imaging, with the image terminal apparatus, an object and generating image data sequentially;
temporarily and sequentially storing, in a buffer memory of the image terminal apparatus, the image data sequentially generated;
sequentially writing the image data temporarily and sequentially stored in the buffer memory on a recording medium attached to the image terminal apparatus externally;

sequentially transmitting from the image terminal apparatus to a peripheral device, the image data stored in the buffer memory according to a predetermined communication standard;

detecting, with the image terminal apparatus, a remaining amount of data storable in the buffer memory;

determining, with the image terminal apparatus, whether the remaining amount of data is equal to or less than a predetermined threshold; and responsive to a determination that the remaining amount of data is equal to or less than the predetermined threshold, decimating, at predetermined intervals, a plurality of pieces of the image data generated thereby defining decimated pieces of the image data and non-decimated pieces of the image data, and sequentially transmitting the non-decimated pieces of the image data to the peripheral device and deleting the decimated pieces of the image data from the buffer memory.

15. A method for controlling an image terminal apparatus, the method comprising:

imaging, with the image terminal apparatus, an object continuously and generating image data sequentially;

temporarily and sequentially storing, in a buffer memory of the image terminal apparatus, the image data sequentially generated;

sequentially writing the image data temporarily and sequentially stored in the buffer memory on a recording medium attached to the image terminal apparatus externally;

sequentially transmitting the image data stored in the buffer memory through communication with a peripheral device according to a predetermined communication standard;

detecting a remaining amount of data storable in the buffer memory;

determining whether the remaining amount of data is equal to or less than a predetermined threshold; and responsive to a determination that the remaining amount of data is equal to or less than the predetermined threshold, transmitting first image data at a start of continuous capturing and second image data at a finish of continuous capturing and deleting, from the buffer memory, at least some of the first image data at the start of continuous capturing and the second image data at the finish of continuous capturing.

* * * * *